No. 798,236. PATENTED AUG. 29, 1905.
H. USENER.
ELECTRIC ANNUNCIATOR.
APPLICATION FILED JAN. 4, 1905.
3 SHEETS—SHEET 1.
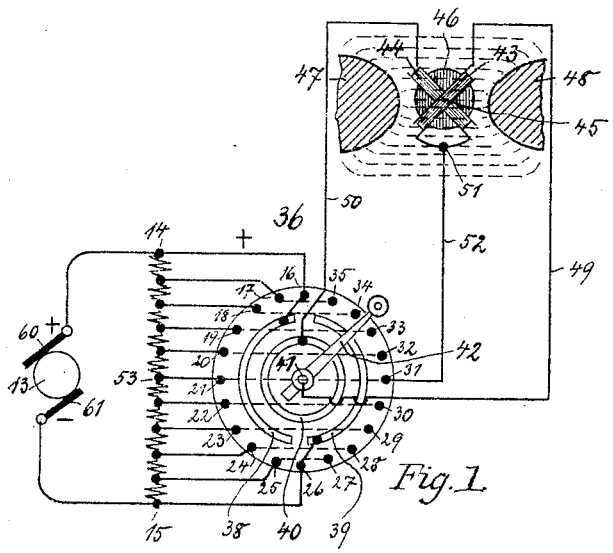
Fig. 1.
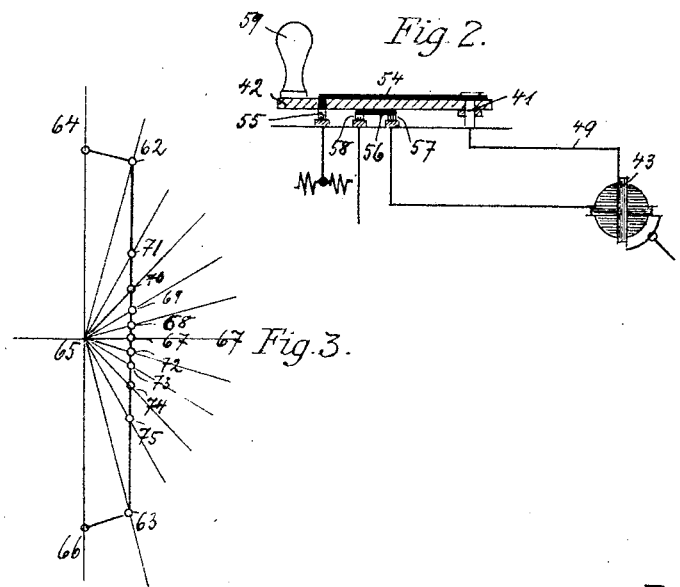
Fig. 2.
Fig. 3.
Witnesses:
Robert Adt
C. H. Fuss.
Inventor:
Hans Usener,
By his Attorney,
F. H. Richards.

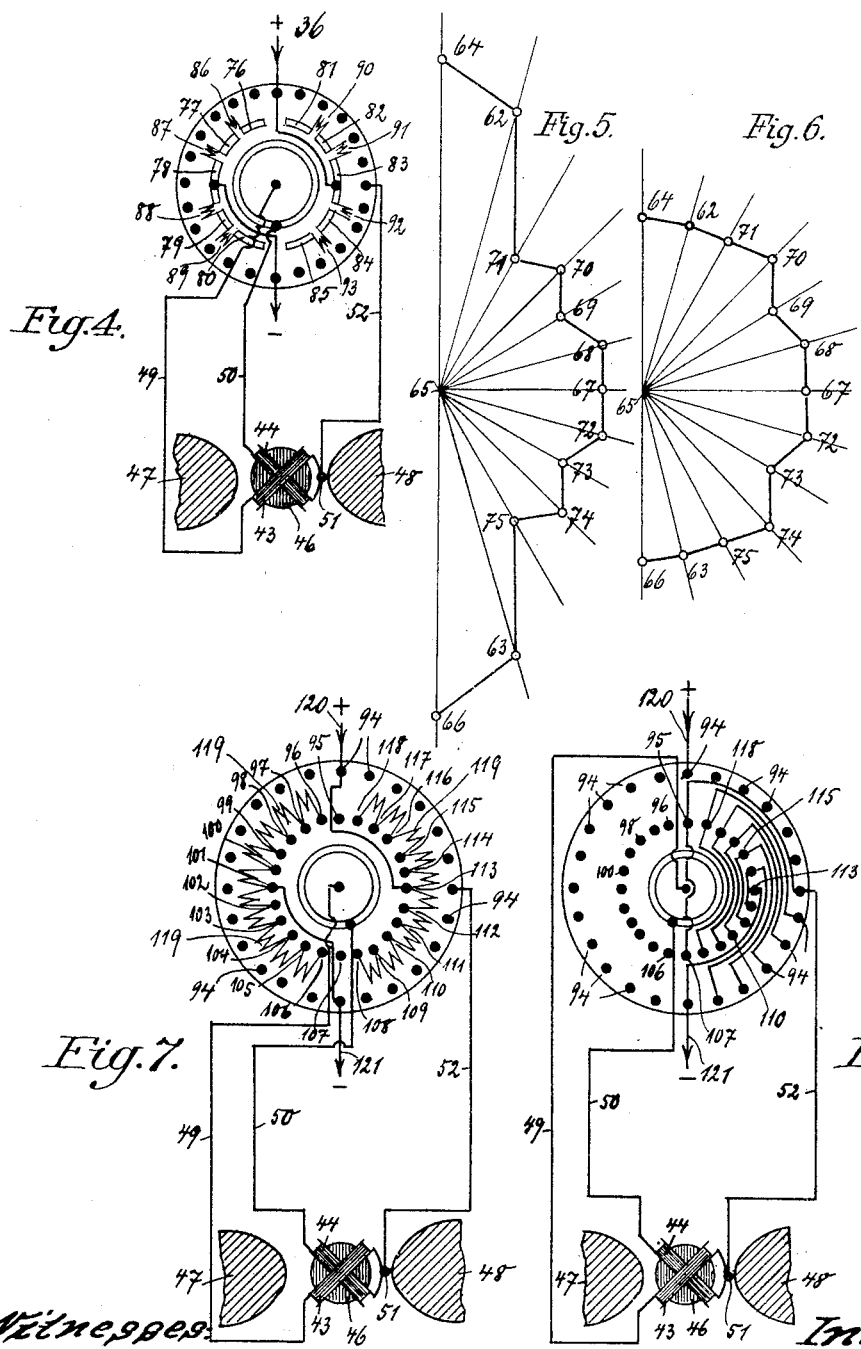

No. 798,236. PATENTED AUG. 29, 1905.
H. USENER.
ELECTRIC ANNUNCIATOR.
APPLICATION FILED JAN. 4, 1905.

3 SHEETS—SHEET 3.

Witnesses:
Robert Aat.
G. G. Fuss.

Inventor:
Hans Usener:
By his Attorney,
F. W. Richards.

UNITED STATES PATENT OFFICE.

HANS USENER, OF KIEL, GERMANY.

ELECTRIC ANNUNCIATOR.

No. 798,236.     Specification of Letters Patent.     Patented Aug. 29, 1905.

Application filed January 4, 1905. Serial No. 239,572.

*To all whom it may concern:*

Be it known that I, HANS USENER, a subject of the German Emperor, residing in Kiel, Germany, have invented certain new and useful Improvements in Electric Annunciators, of which the following is a specification.

The present invention relates to electric-telegraph apparatus, and in particular to devices for indicating at a distance the position of a transmitting lever, pointer, or the like of a machine-telegraph apparatus for transmitting command-signals on board ship, a compass-needle, a water-gage, and so on. Such devices consist in general of a transmitter and of a receiver and means for transmitting current from one to the other. In the ordinary operation of the apparatus the lever or the like of the transmitter is moved by hand or automatically into a definite position, and it is the function of the receiver to indicate this motion automatically at the distant point, so that its pointer or the like is normally always in a position corresponding to the position at the time of the transmitting-lever.

The receiver of the new device consists of an instrument having two crossed coils which are revoluble in a constant magnetic field. The pointer is connected with the axle of the crossed coils, and the problem is to supply to the coils such currents when the transmitting-lever moves that the pointer connected with them moves in unison with the transmitting-lever. This is effected by connecting with the transmitting-lever an electrical contact, which when the said transmitting-lever is moved slides over the separate contacts of a resistance which is traversed by a current, so that the difference of potential at the terminals of the leads connected with the receiver varies according to the differences in potential between the various contacts connected with the resistance.

Figure 9:
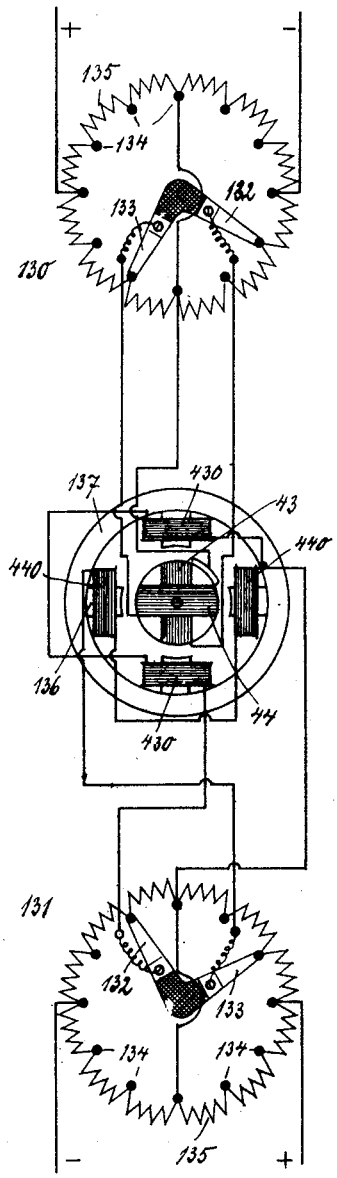
Figure 10:
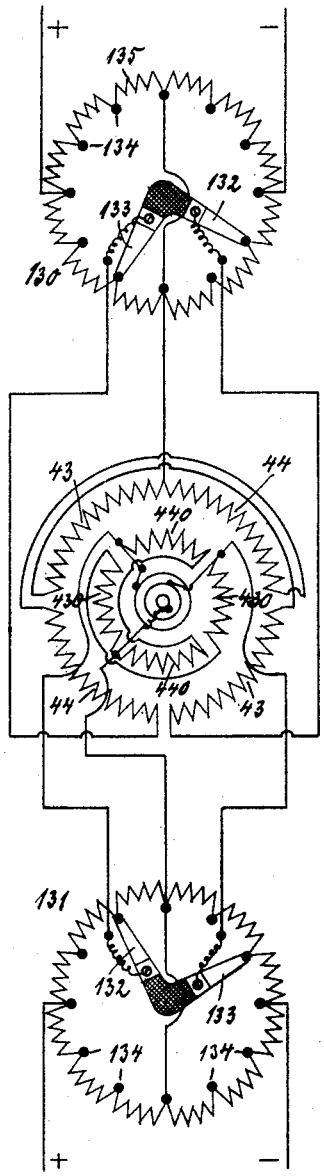

In the accompanying drawings, Figure 1 is a diagram showing the general arrangement of one embodiment of the present invention. Fig. 2 is a diagram illustrating the electrical connections on the transmitter. Fig. 3 is a graphic representation, hereinafter fully explained, showing the manner in which the resultant of the magnetic force of the two coils of the receiver varies for various positions of the transmitting-lever. Fig. 4 illustrates a modification of the apparatus shown in Fig. 1, the transmitting-lever and a few other parts being omitted. Fig. 5 is a diagram similar to Fig. 3, but corresponding to the modified form of apparatus shown in Fig. 4. Fig. 6 is a diagram similar to Fig. 5, corresponding to another modified arrangement similar to that shown in Fig. 4. Fig. 7 is a diagram similar to Fig. 4 and shows another modification of the apparatus shown in Fig. 1. Fig. 8 is a diagram illustrating the manner in which the same resistances may be employed for the variation of the currents traversing the two crossed coils of the receiver hereinafter described. Figs. 9 and 10 show two embodiments of a telegraphic device according to the present invention, by means of which the positions at any given time of two transmitters situated at different places can be compared with one another at a third place.

The present invention relates to a telegraph apparatus in which an instrument consisting of two crossed coils arranged revolubly in a magnetic field serves as a receiver. This receiver is, however, connected with the transmitter in such a manner that one end of each coil is kept at a constant potential which is practically zero, whereas the potentials at the other ends of both coils vary with the displacement of the transmitting-lever. These variable potentials are produced in a manner which in itself is well known—viz., by the transmitting-lever sliding over the various contacts of a resistance traversed by a current.

Fig. 1 shows diagrammatically the arrangement of the principal parts of one embodiment of the present invention. The current produced by the dynamo 13 flows through a resistance 14 15, which is subdivided into a suitable number of sections. The points of connection of the latter are conductively connected with the contacts 16 to 35 of the transmitter 36. These contacts, with the exception of the contacts 16 and 26, are connected together in pairs in the manner indicated by the dotted lines in Fig. 1. The contact 16 is connected electrically with the arc-shaped contact-block 38, while the contact 26 is in a similar manner connected with the arc-shaped contact-block 39. 40 is a circular contact-block, which is concentric with the contact-blocks 38 39 and with the pivot 41 of the transmitting-lever 42. The receiver consists, essentially, of the coil 43, which may be termed the "voltmeter-coil," the coil 44, which may be termed the "counter-force coil," and the field-magnet, of which the poles 47 48 alone are indicated. As shown in Fig. 1, these coils are crossed and are adapted to rotate about their axis 45 in the magnetic field between the poles 47 48. 46 represents the armature of the coils. The pointer of the receiver is not shown in the drawings. It may be mounted on the axle carrying the coils 43 44. The pivot 41 is connected through the lead 49 with one end of the coil 43, and the circular contact-block 40 is connected through the lead 50 with one end of the coil 44. The other ends of the coils 43 44 are connected together in the diagram at the point 51, this point being connected, through the lead 52, with the contact 31 of the transmitter, which is connected with the opposite contact 21 and with the approximately middle point 53 of the resistance 14 15, which point 53 is at approximately zero potential. The transmitting-lever 42, which is formed in the main of insulating material, is, as shown in Fig. 2, mounted on the pivot 41, connected with one end of the coil 43. Said pivot 41 is in electrical contact with a conducting-bar 54, which is in electrical contact with the sliding contact 55, arranged on the under surface of the lever near its outer end. This sliding contact 55 is adapted to make contact with the contacts 16 to 35 when the lever is turned. On the under central portion of the lever a conducting-bar 56 is arranged provided with two rubbing contacts 57 58, the former of which is adapted to continually make contact with the circular contact-block 40 and the latter of which is adapted to make contact with one or other of the arc-shaped contact-blocks 38 39, according to the position of the lever, or to make contact with neither of these blocks when the contact 55 of the lever makes contact with either of the contacts 16 or 26. 59 is the handle for operating the lever.

Referring now to the various circuits shown in Fig. 1, the current from the dynamo divides into three parts. The first part passes through the resistance 14 15. If the brush 60 be the positive brush and the brush 61 the negative, this part of the current flows through the resistance from 14 to 15, the end 14 being at a positive potential and the end 15 at a negative potential. The second part of the current is the part which traverses the coil 43. If the contact 55 of the lever 42 stands on any one of the contacts 16–20 or 32–35, the second part of the current flows from the end 14 of the resistance to that particular contact with which the lever is making contact and thence to the pivot of the lever through the lead 49 to the coil 43, thence through the lead 52 to the point 53, and thence to the end 15 of the resistance. If the contact 55 makes contact with either of the contacts 22–30, the second part flows via 14 and 53 to the lead 52, through the latter to the point 51, thence through the coil 43 and the lead 49 to the pivot 41 and the contact 55, thence through the particular contact which said contact 55 is touching, and so to the end 15 of the resistance. In this latter case it will be noticed that the current flows through the coil 43 in the opposite direction to that holding good in the former case. If the contact 55 makes contact with either of the contacts 21 or 31, the coil 43 is short-circuited and the part of the current alluded to above as the second part is zero. The third part of the current, which is the part which traverses the coil 44, also depends upon the position of the lever. In case the lever is in such a position that the contact-bar 56 makes an electrical connection between the contact-block 40 and the contact-block 39, which is arranged as shown in Fig. 1, then the third part of the current flows from the end 14 to the point 53, through the lead 52 and the coil 44 and lead 50, to the contact-block 40, and thence through the bar 56 to the contact-block 39, the contact 26, and the end 15 of the resistance. In case the contact-bar 56 forms a connection between the contact-blocks 40 and 38 the current in the coil 44 is reversed and flows from the end 14 to the contact-block 38, through the bar 56 to the contact-block 40, thence through the lead 50, coil 44, and lead 52 to the point 53 and end 15. If the lever makes contact with either of the contacts 16 or 26, the contact-block 40 is not connected with either of the blocks 38 or 39, and consequently no current flows through the coil 44, the part of the current termed the "third" part being zero.

Fig. 3 shows graphically the manner in which the resultant of the magnetic forces due to the two coils 43 44 varies in magnitude when the position of the transmitting-lever is changed. The diagram corresponds to only one half of the circle of contacts, the diagram for the other half being similar to the diagram shown. It moreover corresponds to apparatus similar to that shown in Fig. 1, but having one more contact in each quadrant of the circle of contacts than that shown in said figure. In constructing Fig. 3 it is moreover assumed that such values have been found, experimentally or by theory, for the various sections of the resistance 14 15 that when the transmitting-lever moves from one contact to the next the resultant magnetic force moves, with regard to the coils, through the same angle as that moved through by the lever. It is of course understood that the resultant magnetic force is always parallel to the lines of force of the magnetic field produced between the poles 47 48 when the coils are at rest, the coils adjusting themselves until this state of parallelism exists. In Fig. 3, however, as stated above, the relative directions of the resultant force and the coils are shown for various positions of the transmitting-lever. To construct Fig. 3, the axes 64 65 66 and 65 67 are first drawn, the axis 64 65 66 representing the trace or line of section of the plane of the coil 44 with a horizontal plane and the axis 65 67 a similar trace of the plane of the coil 43. Then the thirteen radius-vectors, each of which makes an angle of fifteen degrees with its neighbor, are drawn, it being assumed, as stated above, that the apparatus has been so designed that at each step the magnetic resultant moves with regard to the coils through the same angle as the transmitting-lever. Then the line 62 63 is drawn parallel to the axis 64 65 66 at a distance the abscissa of which corresponds to the magnetic force due to the coil 44, while the contact-bar 56 makes contact between the contact-blocks 40 and 39. The points 62 71 70 69 68 67 72 73 74 75 63 are the points of intersection of the line 62 63 with the radius-vectors which do not coincide with the axis 64 65 66. As the magnetic forces due to the two coils 43 44 act at right angles to one another and as the magnetic force due to the coil 44 is represented in magnitude and direction by the line 65 67, it follows at once from the proposition known as the "parallelogram of forces" that the magnitudes of the resultant in its various directions are represented by the length of the diagonals 65 62, 65 71, 65 70, 65 69, 65 68, 65 67, 65 72, 65 73, 65 74, 65 75, 65 63, respectively. The ordinates 65 64 and 65 66 correspond to the magnetic force due to the coil 43 alone when the current through the coil 44 is zero. It simultaneously follows at once from the parallelogram of forces that the magnetic forces due to the coil 43 are given by the ordinates 67 62, 67 71, 67 70, 67 69, 67 68, zero, 67 72, 67 73, 67 74, 67 75, 67 63, respectively. It being assumed that the magnetic force is proportional to the current flowing through the coil and it being remembered that the current flowing through the coil 43 is practically proportional to the resistance in parallel with which the coil is connected, it will be recognized at once that the various resistances in parallel with which the coil 43 must in turn be connected in order that the resultant magnetic force may take up the directions indicated by the radius-vectors represented must be proportional to the tangents of the angles 67 65 68, 67 65 69, 67 65 70, and so on, under the supposition that the resistance of the coil 43 is very great as compared with these resistances. If the sections of the resistance 14 15 are therefore measured according to the above-mentioned tangent law, the receiver, apart from the small error introduced by the deformation of the current ratios due to the resistance of the voltmeter-coil, and which, moreover, may be reduced to any desired extent, must revolve perfectly synchronously with and under the same angle as the lever of the transmitter. Fig. 3 consequently graphically shows that if the magnetic resultant moves step by step through the same angle as the transmitting-lever the resistances must be adjusted according to the above tangent law and that the magnetic resultant will vary very much in magnitude with various positions of the transmitting-lever. It is of course obvious that the above results are true only when the current flowing through the coil 44 varies as described, having during a complete revolution of the transmitting-lever one positive value, one negative value, other value zero.

It is evident that such a telegraph apparatus renders it possible for the pointer to make a complete revolution, and after the completion of one revolution another revolution in the same direction can be immediately executed, it being unnecessary for the pointer to be turned backward first. This is of special importance if, as is almost always necessary in the case of telegraph command apparatus on ships, an acknowledgment-transmitter must be provided, the arrangement of which is identical with that of the main transmitter. In this case the transmitter of the acknowledgment-telegraph is arranged near the receiver of the main apparatus, and the neutral point of the same is at the constant potential required. Four wires are therefore sufficient for apparatus including an ackowledgment-transmitter. That this is an advantage which is not to be undervalued is self-evident, for any reduction of the number of leads is desirable; but even supposing the number of leads to be three the important fact must be emphasized that, in the case of the present invention, one of these three leads can be connected to a fixed point and only two require to be connected with a sliding contact on the transmitter, instead of it being necessary for all three wires to be provided with a sliding contact. This is of exceedingly great importance when the arrangement is employed for transmitting the indications of a compass, in which case the transmitter is consequently a compass.

It might be pointed out that the system is defective in that the reliability of the reading, which depends upon the absolute magnitude of the magnetic force resultant, is different, as shown above with the aid of Fig. 3, for different positions of the receiving needle or pointer. As is evident from the said figure, the resultant magnetic force is in magnitude considerably smaller in the case of the positions of the pointer situated on the two sides of and in the neighborhood of the contact 31, in which case the magnetic force of the counter-force coil is materially the stronger than in the positions of the transmitting-lever when the latter makes contact with the contact 16 or the contact 26, when the magnetic force of the coil 43 (the voltmeter-coil) is a maximum on account of the current flowing through it being a maximum. This defect can, however, be readily overcome by such a graduation or variation of the current flowing through the counter-force coil that the resultant of the magnetic force becomes uniform to any desired degree of approximation for all positions of the indicating-pointer.

Fig. 4 shows parts of a transmitter and receiver in which the current in the counter-force coil can be given three values, not including the value zero. One difference between the apparatus illustrated in Fig. 4 and that illustrated in Fig. 1 is that instead of the simple arc-shaped blocks 38 and 39 the contact-blocks 76 77 78 79 80 (corresponding to the block 38) and the contact-blocks 81 82 83 84 85 (corresponding to the contact-block 39) are provided. The positive lead connected with the contact 16 is also connected with the contact-block 83, and the negative lead connected with the contact 26 is connected with the contact-block 78. The resistances 86 87 88 89 90 91 92 93 are inserted between the various contact-blocks in the manner indicated in Fig. 4. When the contact-bar 56, Fig. 2, of the transmitting-lever (not shown in Fig. 4) makes contact with the contact-block 83, the current through the counter-force coil is a maximum. After the bar 56 has passed from the contact-block 83 to the block 82 the resistance 91 is inserted in the counter-force-coil circuit. On the bar 56, passing from the contact-block 82 to the contact-block 81, the resistance 90 is inserted in the counter-force-coil circuit. The counter-force coil consequently is traversed by currents of four different strengths, according as the contact-bar 56 makes contact with the blocks 83, 82, or 81 or breaks the circuit entirely.

From the above description, which holds good for the one quadrant of the transmitter, (indicated in Fig. 4,) the manner in which the current in the counter-force coil is graduated or varies when the lever is in the remaining three quadrants will be readily understood.

Fig. 5 shows the manner in which the resultant of the magnetic forces due to the two coils 43 44 varies for the various positions of the transmitting-lever when the current in the counter-force coil is graduated, so as to have four different values (including the value zero) by means of the arrangement shown in Fig. 4. The abscissæ of the points 68 67 72 correspond to the maximum value of the magnetic force due to the current in the counter-force coil. The abscissæ of the points 70 69 73 74 correspond to the values of the magnetic force due to said current after the resistance-coils 91 or 92 have been inserted in series with the counter-force coil. The abscissæ of the points 62 71 75 63 correspond to the value of the magnetic force due to the current after the insertion of the two coils 90 and 91 or the insertion of the two coils 92 and 93, and the abscissæ of the points 64 and 66, which have the value zero, correspond to the zero value of the current.

It will of course be understood that in the case of apparatus corresponding to Figs. 4 and 5 the resistance 14 15 is of course not subdivided according to the tangent law, but is graduated in correspondence with the graduation of the current in the counter-force coil.

Fig. 6 shows the manner in which the resultant of the magnetic forces due to the two receiver-coils varies for various positions of the transmitting-lever when the current in the counter-force coil is graduated so as to have five different values, (including the value zero.) It will be noticed that whereas in Fig. 5 the abscissæ of the points 62 71 75 63 are the same in Fig. 6 the abscissæ of the points 62 63 are different from those of 71 75.

The resultant of the magnetic forces may have the same magnitude for the various positions of the receiving-pointer if for each quadrant the current of the counter-force coil has a different value for each of the contacts which the contact 55 is adapted to touch. The diagram for the resultant of the magnetic forces, if the right values are given to the resistances, will then become a regular polygon—that is to say, the resultants are equal in magnitude to a high degree of approximation about the whole circumference. This equalization of the resultants is obtained in the case of the arrangement shown in Fig. 7, which is as follows: To each contact 94 94, connected with the main resistance 14 15, (shown in Fig. 1, but not in Fig. 7,) one of the contacts 95–118 corresponds. The contact-bar 56, Fig. 2, on the transmitting-lever is adapted to make contact with these contacts 95–118. Resistances 119 are connected between the various contacts 95–118 in the manner shown in Fig. 7. The two contacts 95 and 107 are, however, insulated from all other connections. The positive lead 120 is connected with the contact 113 and the negative lead 121 with the contact 101; otherwise the arrangement shown in Fig. 7 is the same as that shown in Fig. 4, and its method of operation is the same with the exception that each time that the transmitting-lever (not shown in Fig. 7) moves from one position to the next the current flowing through the counter-force coil, as well as that flowing through the voltmeter-coil 43, is varied. If the resistances have their proper values, the resultant of the magnetic forces due to the two coils 43 44 will be constant in magnitude whatever the position of the transmitting-lever may be. The same object instead of being attained by providing resistances between the various contact-blocks adapted to make contact with the bar 56, Fig. 2, which resistances by being inserted in series with the counter-force coil reduce the magnetic force due to the same in the desired manner, can also be attained by connecting the counter-force coil in parallel with sections of the main resistance 14 15 in any suitable manner, such as that shown diagrammatically in Fig. 8.

The arrangement shown in Fig. 8 is as follows: The outer circle of contacts 94 94, which may be called the "voltmeter-coil contacts," and the contacts 95–118, which may be called the "counter-force-coil contacts," are themselves arranged in the same manner as in the embodiment shown in Fig. 7. Resistances are not, however, inserted between the various counter-force-coil contacts; but said contacts are connected with the voltmeter-coil contacts in the manner shown in Fig. 8. By inspecting this figure it will be seen that each of the counter-force-coil contacts is connected with the counter-force-coil contact situated at the same distance from but at the other side of the voltmeter-coil contact, which is connected directly with the lead 52. Thus the contacts 107 and 95 are connected together and also 108 with 118, 109 with 117, 110 with 116, 111 with 115, and 112 with 114. The contact 113 is connected with the negative lead 121. In Fig. 8 the connections are shown only on the right-hand half of the transmitter. On this half the counter-force-coil contacts forming the quadrant of contacts 113–118 and 95 are connected each with that voltmeter-coil contact of the right-hand lower quadrant which is at a distance of ninety degrees. Correspondingly, also, on the left-hand half the counter-force-coil contacts forming the quadrant of contacts 101 to 107 are each connected with that voltmeter-coil contact of the left-hand upper quadrant which is at a distance of ninety degrees. In this left-hand half of the transmitter the counter-force-coil contacts are also connected in pairs similarly to those of the right hand. Thus 106 is connected with 96, 105 with 97, 104 with 98, 103 with 99, 102 with 100, and 101 is connected with the positive lead 120. In this manner also the effect is obtained that the current in the counter-force coil becomes smaller by degrees the further the lever of the transmitter is moved from the contact at practically zero potential connected with the lead 52 toward the contacts connected with the positive and negative leads 120 121, respectively. Under some circumstances the connections in this case also can be further simplified by doing away with the arrangement of a special series of counter-force-coil contacts and by employing an auxiliary transmitting-lever, making an angle of ninety degrees with the main transmitting-lever, said auxiliary lever making contact with the voltmeter-coil contacts. This arrangement, which is hereinafter described with reference to Figs. 9 and 10, is of advantage when it is desired to transmit the complete rotations of the pointer of a vane or of a clock-hand. If it is merely desired to indicate the position of a pointer within a definite angle, one of the systems of connections shown in Figs. 1, 4, 7, or 8 can be employed. It may be emphasized that in this case, as shown in Fig. 1, a bipolar field-magnet is employed on the receiver. In this case one revolution of the transmitting-lever corresponds to one revolution of the receiving-pointer, and each position of the former is indicated by a similar position of the latter. If on the receiver a field-magnet having two $n$ poles be used, $n$ revolutions of the transmitter correspond to one revolution of the receiver. Vice versa, if on the receiver a bipolar field-magnet be employed and if the transmitter, instead of having two points at zero potential and two points at positive and negative potential, respectively, have two $n$ points at zero potential and $n$ points at practically constant positive potential and $n$ at negative potential, arranged symmetrically, one revolution of the transmitting-lever will correspond to $n$ revolutions of the pointer of the receiver.

By means of the arrangements described, on the one hand, any desired number of revolutions of the transmitting-lever, as well as of the pointer of the receiver, are possible in both directions of rotation, and, on the other hand, variations of the potential no longer have any appreciable effect, as the torques of the two coils of the receiver, which are equal and opposite when the pointer is in equilibrium, are equally effected by variations of the voltage as well as by variations in the strength of the field-magnet.

From the doubly symmetrical form of the magnetic field it follows that the resistances must be symmetrically grouped about the contact at zero potential. (In Fig. 1 the contact 31.) The adjustment is for the rest effected empirically, as the magnitude of the separate resistances is a complicated angle function depending on the arrangement selected for graduating or varying the current flowing through the counter-force coil.

If the coils of the receiver are not placed exactly at right angles to one another, a correction is effected by winding about one of the coils some windings in series with the other coil, so that the resultant becomes vertical to the other. The same expedient is resorted to if when using a transmitter with two contact-arms the angle between said arms is not exactly a right angle.

A very important application of the apparatus is for the comparison of the readings of two different transmitters set up at a distance from one another at a third point common for both transmitters. This case occurs if a ship is provided with a gyroscope in addition to the compass and it is desired to show on a suitable instrument at a determined place whether and how much the readings of the two instruments vary from one another at any time, it being of course understood that if no magnetic disturbances or disturbances of any other kind are present at all times the gyroscope and compass should give the same reading. For this purpose the receiver is so constructed that the constant magnetic field, in which, as above described, the system of coils influenced by the transmitter rotates, is substituted by a second fixed system of coils, which is connected up exactly like the first. Both systems of coils are mechanically so arranged that they influence one another magnetically. The one system of coils is influenced by the one transmitter, which, for example, is so connected with the ship's compass that the transmitting-lever rotates with the compass-needle, and the other system of coils is actuated electromagnetically by the other transmitter, which is attached to the gyroscope, for example. The electromagnetic actuation of the systems of coils is effected in the same manner as that in which the revoluble system of coils 43 44 is influenced by the transmitting-lever 42, as described above. If now both transmitting-levers are turned through the same angle, the revoluble system of coils does not rotate, as the magnetic resultant of the magnetic forces of both systems of coils are displaced in the same manner, and consequently no impulse adapted to produce motion arises. If, however, the angles turned through by the two transmitting-levers are different, the resultants of the magnetic forces of the two coils also rotate to different extents, and the result is a rotation of the revoluble system of coils, as the apparatus always so adjusts itself that both resultants of the separate sets of coils set themselves in one and the same direction. It is supposed that the electrical connections between the two transmitting-levers and the two systems of coils are arranged in such a manner that when the two transmitting-levers revolve in the same direction the two magnetic resultants revolve also in the same direction. In this case the rotation of the revoluble system of coils corresponds to the difference between the rotations of the two transmitting-levers, and it is this difference, in general, that the observer ought to know; but attention is directed to the fact that it is possible to arrange the apparatus in such way that the rotation of the revoluble system of coils indicates the sum of (and not the difference between) the angles turned through by the two transmitting-levers. For that reason the electrical connections between the transmitters and the receiver must be so arranged that if the two transmitting-levers are rotated in the same direction the magnetic resultants of the two systems of coils rotate in opposite directions to each other. In this arrangement, however, the revoluble system of coils also rotates when the two transmitting-levers are turned through the same angle, the rotation being equal to twice the angle through which the two transmitting-levers are turned. In Figs. 9 and 10 two embodiments of such an arrangement are diagrammatically represented. Referring in the first place to Fig. 9, 130 and 131 are the two transmitters the positions of the pointers or levers of which are to be compared at a distant and one and the same spot. 132 133 are the main and auxiliary transmitting-levers, respectively. They are arranged at an angle of ninety degrees, and both are adapted to make contact with the contacts 134, between which the resistances 135 are inserted in the manner indicated in the figures. The transmitting-levers may, for instance, be fastened one to a compass and the other to a gyroscope, so that they may turn with these. The transmitter 130 is connected with the revoluble system of coils 43 44, which is arranged as described above. The constant magnetic field of the receiver, as described in the former part of the specification, is, however, substituted by the system of coils 430 440, which coils are fixed and which influence the revoluble system of coils magnetically. The coils 440 440 430 430 are wound upon the four pole-pieces 136 of the annular field-magnet 137. The coils 440 440, which are connected together in series and which electrically may be considered as the equivalent of a single counterforce coil, are connected with the transmitter 131 in the same manner as the counter-force coil 44 with the transmitter 130. The two voltmeter-coils 430 430, and which are also connected together in series, are also connected with the transmitter 131 in the same manner as the voltmeter-coil 43 with the transmitter 130. The embodiment shown in Fig. 10 is essentially the same as that shown in Fig. 9. Nevertheless the revoluble and stationary systems of the common receiver are provided with ring-windings. The various parts shown in Fig. 10 are indicated by the same reference-letters as similar parts in Fig. 9, so that Fig. 10 will be understood without further description being necessary. It will be noticed that in Fig. 10 the revoluble-coil system is connected with the transmitter 131 and the fixed-coil system with the transmitter 130.

What I claim as my invention, and desire to secure by Letters Patent, is—

1. In an electric-telegraph apparatus, the combination of a magnet producing a magnetic field, two rigidly-interconnected coils, having magnetic axes inclined to one another, revolubly mounted in said field and forming with the latter a receiver, a transmitter comprising means adapted to vary the potential of the one end of each coil, and means for maintaining the other end of each coil at a substantially constant potential of a magnitude between the maximum and minimum values of the potentials of the other ends, substantially as and for the purpose set forth.

2. In an electric-telegraph apparatus, the combination of a magnet producing a magnetic field, two rigidly-interconnected coils having magnetic axes inclined to one another, revolubly mounted in said field and forming with the latter a receiver, an electric circuit comprising an electric generator and a resistance, means for maintaining the one end of each coil and one point of the resistance at substantially the same potential, means for electrically connecting the other end of one coil with various parts of the resistance, and means for varying the potential of the other end of the other coil, substantially as and for the purpose set forth.

3. In an electric-telegraph apparatus, the combination of a magnet producing a magnetic field, two rigidly-interconnected coils, having magnetic axes inclined to one another, revolubly mounted in said field and forming with the latter a receiver, an electric circuit comprising an electric generator and a resistance, means for maintaining the one end of each coil and one point of the resistance at substantially the same potential, and means for electrically connecting the other end of the two coils with various parts of the resistance, substantially as and for the purpose set forth.

4. In an electric-telegraph apparatus, the combination of a magnet producing a magnetic field, two rigidly-interconnected coils, having magnetic axes inclined to one another, revolubly mounted in said field and forming with the latter a receiver, an electric circuit comprising an electric generator, a resistance composed of a plurality of sections, and a plurality of contacts arranged in a circle and electrically connected with said sections, two revoluble arms adapted to make contact with said contacts, the one arm being at an angle of approximately ninety degrees to the other arm, means for maintaining the one end of each coil and one point of the resistance at substantially the same potential, and means electrically connecting the other ends of the two coils with the two arms respectively, substantially as and for the purpose set forth.

5. In an electric-telegraph apparatus, the combination of a receiver comprising a field-magnet, two coils on said field-magnet adapted to produce magnetic fields having axes inclined to one another, an armature revolubly mounted in the field of the field-magnet, and two coils on said armature having magnetic axes inclined to one another; two transmitters; means connecting one transmitter with the field-magnet coils and means connecting the other transmitter with the armature-coils; each transmitter comprising means adapted to vary the potential of the one end of each of the coils with which it is connected, and means for maintaining the other end of each coil with which it is connected at a substantially contact potential of a magnitude between the maximum and minimum values of the potentials of the other said ends of the coils with which it is connected, substantially as and for the purpose set forth.

In testimony whereof I have signed my name to this specification in the presence of two subscribing witnesses.

HANS USENER.

Witnesses:
    JULIUS ROPKE,
    CARL FUHLJAHN.